United States Patent [19]

Aspden

[11] Patent Number: 4,712,015
[45] Date of Patent: Dec. 8, 1987

[54] SHIELDS FOR NUCLEAR REACTORS

[75] Inventor: Garth J. Aspden, Bolton, England

[73] Assignee: National Nuclear Corporation Limited, Knutsford, England

[21] Appl. No.: 799,579

[22] Filed: Nov. 19, 1985

[30] Foreign Application Priority Data

Dec. 17, 1984 [GB] United Kingdom ............... 8431754

[51] Int. Cl.$^4$ .................. G21C 13/06; G21C 9/00
[52] U.S. Cl. ........................... 250/517.1; 250/515.1; 52/1; 52/573; 52/593; 376/206; 376/460
[58] Field of Search .............. 250/517.1, 515.1; 52/1, 52/573, 593; 376/205, 206, 460

[56] References Cited

U.S. PATENT DOCUMENTS

| 4,050,987 | 9/1977 | Wade | 376/206 |
| 4,078,969 | 3/1978 | Garin | 376/206 |
| 4,192,717 | 3/1980 | Gross | 176/87 |
| 4,330,370 | 5/1982 | Kazan et al. | 376/206 |

FOREIGN PATENT DOCUMENTS

| 1955501 | 6/1970 | Fed. Rep. of Germany . |
| 2359810 | 6/1975 | Fed. Rep. of Germany . |
| 2297482 | 8/1976 | France . |
| 1212480 | 11/1970 | United Kingdom . |
| 1499291 | 1/1978 | United Kingdom . |

Primary Examiner—Craig E. Church
Assistant Examiner—Jack I. Berman
Attorney, Agent, or Firm—William R. Hinds

[57] ABSTRACT

A roof shield for a nuclear reactor comprises a normally fixed radially outer portion, a radially inner portion rotatable about a vertical axis, and a connection between the inner and outer portions which permits relative angular movement between the portions without loss of containment, the connection comprising a radially inner wall of the outer portion, an upper portion of the inner wall being so arranged that on upward movement of the inner portion the upper wall portion receives substantially no angular movement, the lower end of the upper portion being at a position below the level of the upper surface of the outer portion.

6 Claims, 2 Drawing Figures

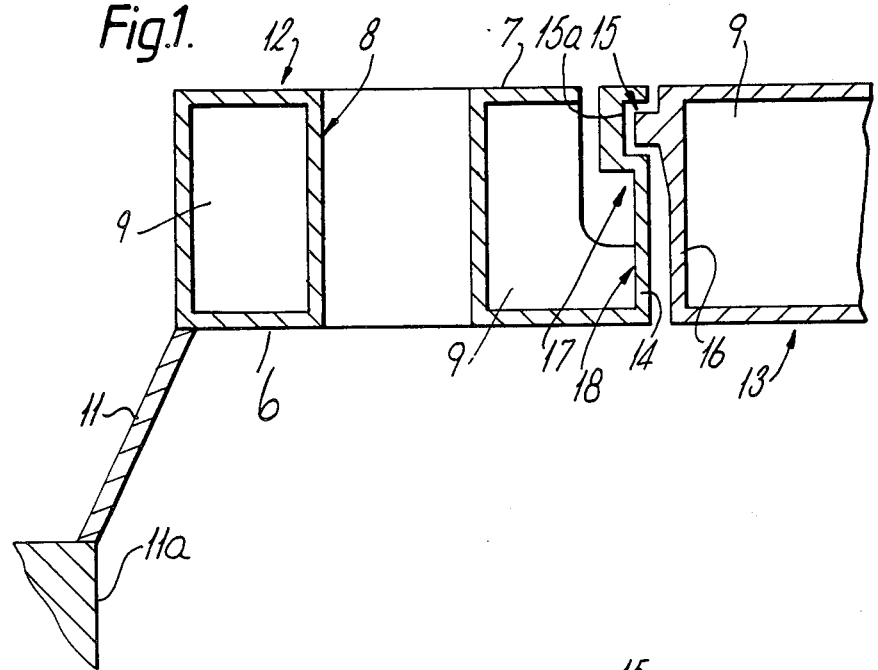
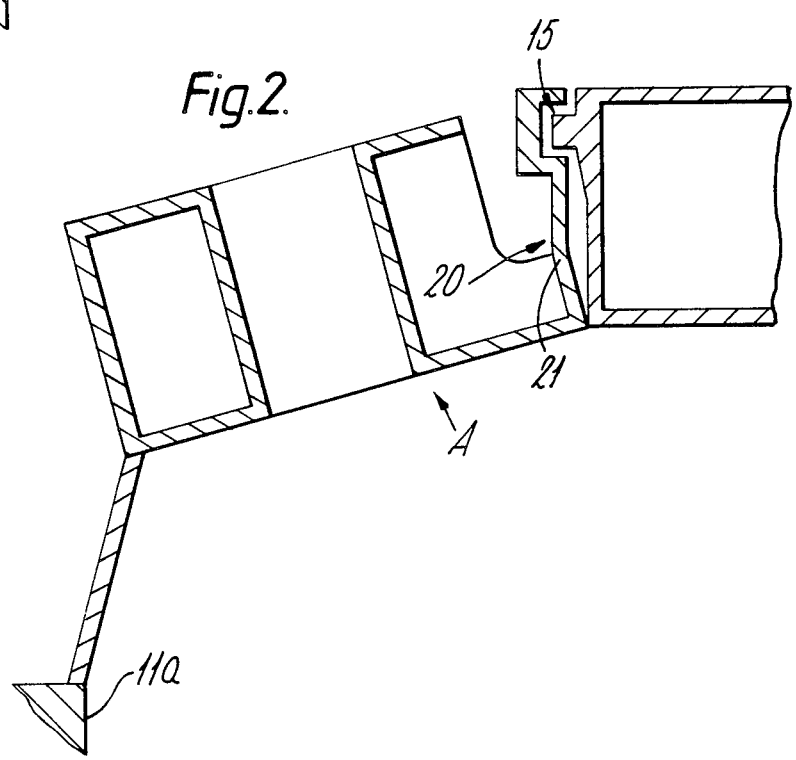

SHIELDS FOR NUCLEAR REACTORS

This invention relates to shields for nuclear reactors.

In a nuclear reactor under hypothetical core disruptive accident (HCDA) conditions, the primary coolant circuit experiences an internal pressure, for example approximately 5MPa maximum. This pressure acting on the lower surface of the roof shield is greater than the roof shield weight and would lift the roof shield, thus breaking containment. Therefore a roof hold-down device in the form of interlocking keys is provided.

However, the roof shield may also rotate thus allowing separation of the keys and loss of containment.

According to one aspect of the invention a roof shield for a nuclear reactor comprises a normally fixed radially outer portion, a radially inner portion rotatable about a vertical axis, and a connection between the inner and outer portions which permits relative angular movement between the portions without loss of containment, the connection comprising a radially inner wall of the outer portion, an upper portion of the inner wall being so arranged that on upward movement of the inner portion the upper portion receives substantially no angular movement, the lower end of the upper portion being at a position below the level of the upper surface of the outer portion.

According to another aspect of the invention a roof shield for a nuclear reactor comprises a normally fixed radially outer portion, a radially inner portion rotatable about a vertical axis, a connection between the inner and outer portions, the outer portion comprising a radially inner wall, an upper portion of the inner wall being operable as a cantilever from a position below the level of an upper surface of the outer portion, such that on upward movement of the inner portion the inner wall bends in the region of said position and the connection is maintained without loss of containment.

The outer portion may have top and bottom walls and a radially inner wall forming part of said connection and connected to the bottom wall such that on said upward movement the top wall moves away from said upper portion which bends in the region of said position.

The upper portion is connected in a containment maintaining manner to the inner portion, for example, by interlocking keys.

The invention may be performed in various ways and one specific embodiment with possible modifications will now be described by way of example with reference to the accompanying diagrammatic drawings, in which:

FIG. 1 is a part section of part of a reactor shield roof; and

FIG. 2 is a view of FIG. 1 in another condition.

A shield 10 for a nuclear reactor core includes a conical side 11 supported on a concrete vault 11a, a normally fixed radially outer annular roof shield 12 (only part shown) and a central radially inner above-core shield 13 (only part shown). The shields 12, 13 are normally fitted with concrete in spaces 9. The shield may have penetrations, one of which is shown at 8. The inner shield 13 can rotate about a vertical axis and may itself have a further inner part also rotatable about a vertical axis. The shield 12 has upper wall 7 and bottom wall 6.

The shield 12 includes radially inner wall 14 connected by uninterrupted annular interlocking keys and keyways shown schematically at 15, 15a to the annular wall 16 of the shield 13. The keys connecting are present as a full circle in this plane. In the present case an upper portion 17 of the wall 14 is free standing or cantilevered ie is not connected to the upper wall 7 and the lower portion 18 is fully built into the roof 12. Thus in the normal condition the portion 17 is vertically above the encastre (fixed end) cylinder 18. The concrete engages the wall 14 and 17 in FIG. 1. The wall 17 is annular and continuous around the shield 12.

If the roof rotates under pressure about an axis transverse to the vertical (arrow A) and the inner portion moves upward most of the upper cylinder portion 17 undergoes only vertical movement and there is substantially no radial expansion at the position of keys 15 which therefore remain locked and there is no loss of containment. Under these conditions the effect of roof rotation is accommodated in the free standing portion 17 by a region 20 of axial bending near to the connection 21 between the portions 17 and 18. A similar effect occurs at all points around the circumference. The distortion shown in FIG. 2 is exaggerated for clarity.

I claim:

1. A roof shield for a nuclear reactor comprising a normally fixed radially outer portion having a radially inner wall, a radially inner portion rotatable about a vertical axis, and a connection between the inner and outer portions which permits relative angular movement between the portions without loss of containment, the connection being on the radially inner side of an upper portion of the radially inner wall of the outer portion, the upper portion of the inner wall being connected to the outer portion only at the lower end of the upper portion and the upper portion being so arranged that on upward movement of the inner portion the upper portion of the inner wall receives substantially no angular movement, the lower end of the upper portion being at a position below the connection and below the level of the upper surface of the outer portion.

2. A roof shield as claimed in claim 1, in which the outer portion has top and bottom walls, said radially inner wall connected to the bottom wall such that on said upward movement the top wall moves away from said upper portion which bends in the region of said position.

3. A roof shield as claimed in claim 1, in which the connection comprises keys.

4. A roof shield as claimed in claim 1 wherein the connection is below the upper surfaces of the inner and outer portions.

5. A roof shield for a nuclear reactor comprising a normally fixed radially outer portion having a radially inner wall, a radially inner portion rotatable about a vertical axis, a connection between the inner and outer portions, the connection being on the radially inner side of an upper portion of the radially inner wall, the upper portion of the inner wall being operable as a cantilever from a position below the connection and below the level of an upper surface of the outer portion, such that on upward movement of the inner portion the radially inner wall bends in the region of said position and the connection is maintained without loss of containment.

6. A roof shield as claimed in claim 5, in which the connection comprises keys at a level which is below the upper surface of the outer portion and above said position.

* * * * *